(12) United States Patent
Guérin

(10) Patent No.: US 6,673,881 B2
(45) Date of Patent: Jan. 6, 2004

(54) PROCESS FOR THE PREPARATION OF LOW MOLECULAR WEIGHT HYDROGENATED NITRILE RUBBER

(75) Inventor: Frédéric Guérin, Petrolia (CA)

(73) Assignee: Bayer Inc., Sarnia (CA)

( * ) Notice: Subject to any disclaimer, the term of this patent is extended or adjusted under 35 U.S.C. 154(b) by 16 days.

(21) Appl. No.: 10/167,262

(22) Filed: Jun. 10, 2002

(65) Prior Publication Data

US 2003/0096913 A1 May 22, 2003

(30) Foreign Application Priority Data

Jun. 12, 2001 (CA) ............................................. 2350280
Sep. 18, 2001 (CA) ............................................. 2357465

(51) Int. Cl.⁷ ............................. C08F 4/44; B01J 31/18

(52) U.S. Cl. ....................... 526/160; 526/161; 526/171; 526/172; 526/297; 526/341; 526/348; 526/905; 502/155; 502/167

(58) Field of Search ................................ 526/160, 161, 526/171, 172, 905, 341, 348, 297; 502/155, 167

(56) References Cited

U.S. PATENT DOCUMENTS

| | | | |
|---|---|---|---|
| 3,700,637 A | 10/1972 | Finch, Jr. | 260/83.3 |
| 4,464,515 A | 8/1984 | Rempel et al. | 525/338 |
| 4,503,196 A | 3/1985 | Rempel et al. | 525/338 |
| 4,581,417 A | 4/1986 | Buding et al. | 525/338 |
| 4,631,315 A | 12/1986 | Buding et al. | 525/338 |
| 4,746,707 A | 5/1988 | Fiedler et al. | 525/338 |
| 4,795,788 A | 1/1989 | Himmler et al. | 525/338 |
| 4,812,528 A | 3/1989 | Rempel et al. | 525/338 |
| 4,978,771 A | 12/1990 | Fiedler et al. | 558/459 |
| RE34,548 E | 2/1994 | Fiedler et al. | 525/329.3 |
| 6,159,890 A * | 12/2000 | Nubel et al. | 502/155 |

FOREIGN PATENT DOCUMENTS

| | | |
|---|---|---|
| CA | 2048929 | 2/1992 |
| GB | 1558491 | 1/1980 |

* cited by examiner

*Primary Examiner*—Robert Harlan
(74) *Attorney, Agent, or Firm*—Joseph C. Gil; Jennifer R. Seng

(57) ABSTRACT

A hydrogenated nitrile rubber having lower molecular weights and narrower molecular weight distributions than those known in the art can be prepared by the olefin metathesis of nitrile butadiene rubber, followed by hydrogenation of the resulting metathesized NBR.

13 Claims, 1 Drawing Sheet

PROCESS FOR THE PREPARATION OF LOW MOLECULAR WEIGHT HYDROGENATED NITRILE RUBBER

FIELD OF THE INVENTION

The present invention relates to a process for the production of hydrogenated nitrile rubber polymers having lower molecular weights and narrower molecular weight distributions than those known in the art.

BACKGROUND OF THE INVENTION

Hydrogenated nitrile rubber (HNBR), prepared by the selective hydrogenation of acrylonitrile-butadiene rubber (nitrile rubber; NBR, a co-polymer comprising at least one conjugated diene, at least one unsaturated nitrile and optionally further comonomers), is a specialty rubber which has very good heat resistance, excellent ozone and chemical resistance, and excellent oil resistance. Coupled with the high level of mechanical properties of the rubber (in particular the high resistance to abrasion) it is not surprising that HNBR has found widespread use in the automotive (seals, hoses, bearing pads) oil (stators, well head seals, valve plates), electrical (cable sheathing), mechanical engineering (wheels, rollers) and shipbuilding (pipe seals, couplings) industries, amongst others.

Commercially available HNBR has a Mooney viscosity in the range of from 55 to 105, a molecular weight in the range of from 200,000 to 500,000 g/mol, a polydispersity greater than 3.0 and a residual double bond (RDB) content in the range of from 1 to 18% (by IR spectroscopy).

One limitation in processing HNBR is the relatively high Mooney Viscosity. In principle, HNBR having a lower molecular weight and lower Mooney viscosity would have better processability. Attempts have been made to reduce the molecular weight of the polymer by mastication (mechanical breakdown) and by chemical means (for example, using strong acid), but such methods have the disadvantages that they result in the introduction of functional groups (such as carboxylic acid and ester groups) into the polymer, and the altering of the microstructure of the polymer. This results in disadvantageous changes in the properties of the polymer. In addition, these types of approaches, by their very nature, produce polymers having a broad molecular weight distribution.

A hydrogenated nitrile rubber having a low Mooney (<55) and improved processability, but which has the same microstructure as those rubbers which are currently available, is difficult to manufacture using current technologies. The hydrogenation of NBR to produce HNBR results in an increase in the Mooney viscosity of the raw polymer. This Mooney Increase Ratio (MIR) is generally around 2, depending upon the polymer grade, hydrogenation level and nature of the feedstock. Furthermore, limitations associated with the production of NBR itself dictate the low viscosity range for the HNBR feedstock. Currently, one of the lowest Mooney viscosity products available is Therban® VP KA 8837 (available from Bayer), which has a Mooney viscosity of 55 (ML 1+4 @ 100° C.) and a RDB of 18%.

Figure 1:
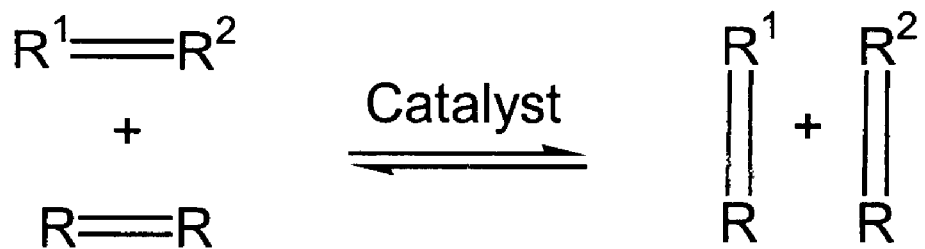

Karl Ziegler's discovery of the high effectiveness of certain metal salts, in combination with main group alkylating agents, to promote olefin polymerization under mild conditions has had a significant impact on chemical research and production to date. It was discovered early on that some "Ziegler-type" catalysts not only promote the proposed coordination-insertion mechanism but also effect an entirely different chemical process, that is the mutual exchange (or metathesis) reaction of alkenes according to a scheme as shown in FIG. 1.

Acyclic diene metathesis (or ADMET) is catalyzed by a great variety of transition metal complexes as well as non-metallic systems. Heterogeneous catalyst systems based on metal oxides, sulfides or metal salts were originally used for the metathesis of olefins. However, the limited stability (especially towards hetero-substituents) and the lack of selectivity resulting from the numerous active sites and side reactions are major drawbacks of the heterogeneous systems.

Homogeneous systems have also been devised and used to effect olefin metathesis. These systems offer significant activity and control advantages over the heterogeneous catalyst systems. For example, certain Rhodium based complexes are effective catalysts for the metathesis of electron-rich olefins.

The discovery that certain metal-alkylidene complexes are capable of catalyzing the metathesis of olefins triggered the development of a new generation of well-defined, highly active, single-site catalysts. Amongst these, Bis-(tricyclohexylphosphine)-benzylidene ruthenium dichloride (commonly know as Grubb's catalyst) has been widely used, due to its remarkable insensitivity to air and moisture and high tolerance towards various functional groups. Unlike the molybdenum-based metathesis catalysts, this ruthenium carbene catalyst is stable to acids, alcohols, aldehydes and quaternary amine salts and can be used in a variety of solvents ($C_6H_6$, $CH_2Cl_2$, THF, t-BuOH).

The use of transition-metal catalyzed alkene metathesis has since enjoyed increasing attention as a synthetic method. The most commonly used catalysts are based on Mo, W and Ru. Research efforts have been mainly focused on the synthesis of small molecules, but the application of olefin metathesis to polymer synthesis has allowed the preparation of new polymeric material with unprecedented properties (such as highly stereoregular poly-norbornadiene).

Figure 2:
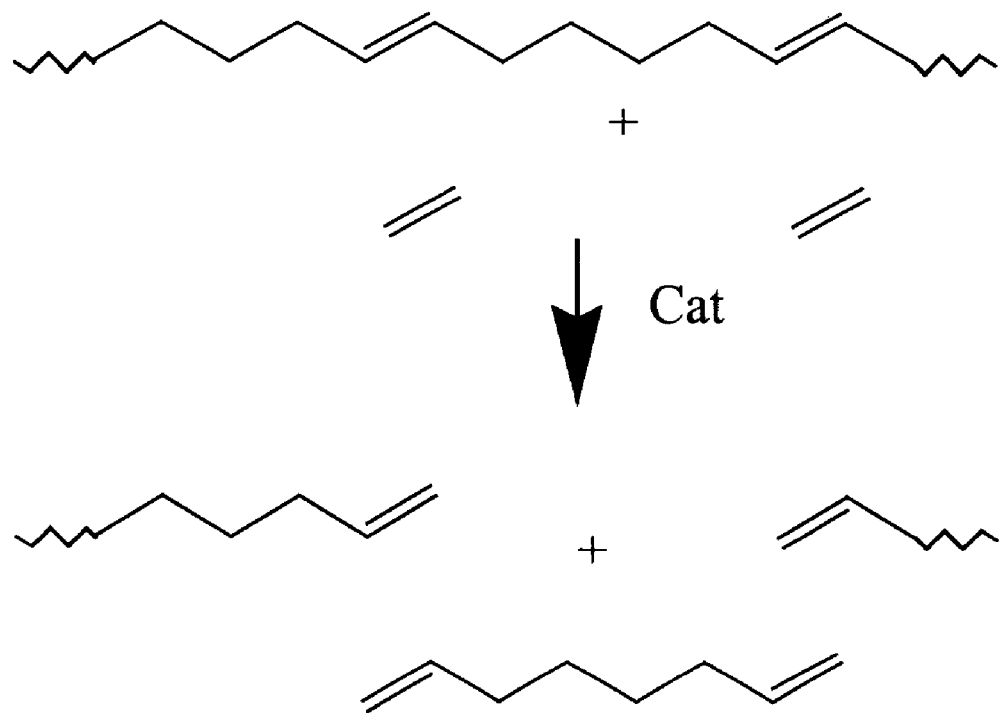

The utilization of olefin metathesis as a means to produce low molecular weight compounds from unsaturated elastomers has received growing interest. The principle for the molecular weight reduction of unsaturated polymers is shown in FIG. 2. The use of an appropriate catalyst allows the cross-metathesis of the unsaturation of the polymer with the co-olefin. The end result is the cleavage of the polymer chain at the unsaturation sites and the generation of polymer fragments having lower molecular weights. In addition, another effect of this process is the "homogenizing" of the polymer chain lengths, resulting in a reduction of the polydispersity. From an application and processing stand point, a narrow molecular weight distribution of the raw polymer results in improved physical properties of the vulcanized rubber, whilst the lower molecular weight provides good processing behavior.

The so-called "depolymerization" of copolymers of 1,3-butadiene with a variety of co-monomers (styrene, propene, divinylbenzene and ethylvinylbenzene, acrylonitrile, vinyltrimethylsilane and divinyidimethylsilane) in the presence of classical Mo and W catalyst system has been investigated. Similarly, the degradation of a nitrile rubber using $WCl_6$ and $SnMe_4$ or $PhC \equiv CH$ co-catalyst was reported in 1988. However, the focus of such research was to produce only low molecular fragments, which could be characterized by conventional chemical means and contains no teaching with respect to the preparation of low molecular weight nitrile rubber polymers. Furthermore, such processes are non-controlled and produce a wide range of products.

The catalytic depolymerization of 1,4-polybutadiene in the presence of substituted olefins or ethylene (as chain transfer agents) in the presence of well-defined Grubb's or Schrock's catalysts is also possible. The use of Molybdenum or Tungsten compounds of the general structural formula {M(=NR$_1$)(OR$_2$)$_2$(=CHR); M=Mo, W} to produce low molecular weight polymers or oligomers from gelled polymers containing internal unsaturation along the polymer backbone was claimed in U.S. Pat. No. 5,446,102. Again, however, the process disclosed is non-controlled, and there is no teaching with respect to the preparation of low molecular weight nitrile rubber polymers.

SUMMARY OF THE INVENTION

We have now discovered that hydrogenated nitrile rubber having lower molecular weights and narrower molecular weight distributions than those known in the art can be prepared by the olefin metathesis of nitrile butadiene rubber, followed by hydrogenation of the resulting metathesized NBR.

Thus, the present invention is directed to a process for the preparation of a hydrogenated nitrile rubber. The process of the present invention includes a) reacting a nitrile rubber in the presence of at least one co-olefin and at least one compound selected from the group consisting of compounds of the general formulas I, II, III or IV,

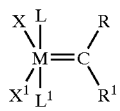

Formula I wherein

M is Os or Ru,

R and R$^1$ are, independently, hydrogen or a hydrocarbon selected from the group consisting of C$_2$–C$_{20}$ alkenyl, C$_2$–C$_{20}$ alkynyl, C$_1$–C$_{20}$ alkyl, aryl, C$_1$–C$_{20}$ carboxylate, C$_1$–C$_{20}$ alkoxy, C$_2$–C$_{20}$ alkenyloxy, C$_2$–C$_{20}$ alkynyloxy, aryloxy, C$_2$–C$_{20}$ alkoxycarbonyl, C$_1$–C$_{20}$ alkylthio, C$_1$–C$_{20}$ alkylsulfonyl and C$_1$–C$_{20}$ alkylsulfinyl, X and X$^1$ are independently any anionic ligand; and L and L$^1$ are independently any neutral ligand, such as phosphines, amines, thioethers or imidazolidines or any neutral carbine, optionally, L and L$^1$ can be linked to one another to from a bidentate neutral ligand;

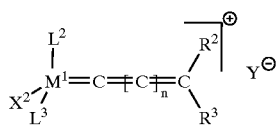

Formula II wherein

M$^1$ is Os or Ru,

R$^2$ and R$^3$ are, independently, hydrogen or a hydrocarbon selected from the group consisting of C$_2$–C$_{20}$ alkenyl, C$_2$–C$_{20}$ alkynyl, C$_1$–C$_{20}$ alkyl, aryl, C$_1$–C$_{20}$ carboxylate, C$_1$–C$_{20}$ alkoxy, C$_2$–C$_{20}$ alkenyloxy, C$_2$–C$_{20}$ alkynyloxy, aryloxy, C$_2$–C$_{20}$ alkoxycarbonyl, C$_1$–C$_{20}$ alkylthio, C$_1$–C$_{20}$ alkylsulfonyl and C$_1$–C$_{20}$ alkylsulfinyl, X$^2$ is a anionic ligand, L$^2$ is a neutral π-bonded lignand, preferably an arene, substituted arene, heteroarene, independent of whether they are mono- or polycyclic, L$^3$ is a ligand selected from the group consisting of phosphines, sulfonated phosphines, fluorinated phosphines, functionalized phosphines bearing up to three aminoalkyl-, ammoniumalkyl-, alkoxyalkyl-, alkoxylcarbonylalkyl-, hydrocycarbonylalkyl-, hydroxyalkyl- or ketoalkyl-groups, phosphites, phosphinites, phosphonites, phosphinamines, arsines, stibenes, ethers, amines, amides, imines, sulfoxides, thioethers and pyridines, Y$^-$ is a non-coordinating anion, n is an integer in the range of from 0 to 5,

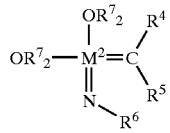

Formula III wherein

M$^2$ is Mo or W,

R$^4$ and R$^5$ are, independently, hydrogen or a hydrocarbon selected from the group consisting of C$_2$–C$_{20}$ alkenyl, C$_2$–C$_{20}$ alkynyl, C$_1$–C$_{20}$ alkyl, aryl, C$_1$–C$_{20}$ carboxylate, C$_1$–C$_{20}$ alkoxy, C$_2$–C$_{20}$ alkenyloxy, C2–C$_{20}$ alkynyloxy, aryloxy, C$_2$–C$_{20}$ alkoxycarbonyl, C$_1$–C$_{20}$ alkylthio, C$_1$–C$_{20}$ alkylsulfonyl and C$_1$–C$_{20}$ alkylsulfinyl, R$^6$ and R$^7$ are independently selected from any unsubstituted or halo-substituted alkyl, aryl, aralkyl groups or silicon-containing analogs thereof,

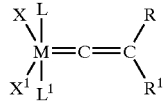

Formula IV wherein

M is Os or Ru,

R and R$^1$ are independently selected from the group consisting of hydrogen, substituted or unsubstituted alkyl, and substituted or unsubstituted alkyl, X and X$^1$ are independently any anionic ligand, L and L$^1$ are independently any neutral ligand, such as phosphines, amines, thioethers or imidazolidines or any neutral carbine, optionally, L and L$^1$ can be linked to one another to from a bidentate neutral ligand; and b) hydrogenation of the product of step a).

The process of the present invention is capable of producing a hydrogenated nitrile rubber having a molecular weight (Mw) in the range of from 30,000 to 250,000, a Mooney viscosity (ML 1+4 @ 100 deg. C) of in the range of from 3 to 50, and a MWD (or polydispersity index) of less than 2.5.

DETAILED DESCRIPTION OF THE INVENTION

As used throughout this specification, the term "nitrile polymer" is intended to have a broad meaning and is meant to encompass a copolymer having repeating units derived from at least one conjugated diene, at least one α,β- unsaturated nitrile and optionally further one or more copolymerizable monomers.

The conjugated diene may be any known conjugated diene, preferably a $C_4$–$C_6$ conjugated diene. Preferred conjugated dienes include butadiene, isoprene, piperylene, 2,3-dimethyl butadiene and mixtures thereof. Even more preferred $C_4$–$C_6$ conjugated dienes include butadiene, isoprene and mixtures thereof. The most preferred $C_4$–$C_6$ conjugated diene is butadiene.

The unsaturated α,β-unsaturated nitrile may be any known α,β-unsaturated nitrile, preferably a $C_3$–$C_5$ α,β-unsaturated nitrile. Preferred $C_3$–$C_5$ α,β-unsaturated nitriles include acrylonitrile, methacrylonitrile, ethacrylonitrile and mixtures thereof. The most preferred $C_3$–$C_5$ α,β-unsaturated nitrile is acrylonitrile.

Preferably, the copolymer contains in the range of from 40 to 85 weight percent of repeating units derived from one or more conjugated dienes and in the range of from 15 to 60 weight percent of repeating units derived from one or more unsaturated nitrites. More preferably, the copolymer contains in the range of from 60 to 75 weight percent of repeating units derived from one or more conjugated dienes and in the range of from 25 to 40 weight percent of repeating units derived from one or more unsaturated nitriles. Most preferably, the copolymer contains in the range of from 60 to 70 weight percent of repeating units derived from one or more conjugated dienes and in the range of from 30 to 40 weight percent of repeating units derived from one or more unsaturated nitrites.

Optionally, the copolymer may further contain repeating units derived from one or more copolymerizable monomers, such as unsaturated carboxylic acids. Non-limiting examples of suitable unsaturated carboxylic acids include fumaric acid, maleic acid, acrylic acid, methacrylic acid and mixtures thereof. Repeating units derived from one or more copolymerizable monomers will replace either the nitrile or the diene portion of the nitrile rubber and it will be apparent to those skilled in the art that the above mentioned weight percents will have to be adjusted to result in 100 weight percent. In case of the mentioned unsaturated carboxylic acids, the nitrile rubber preferably contains repeating units derived from one or more unsaturated carboxylic acids in the range of from 1 to 10 weight percent of the rubber, with this amount displacing a corresponding amount of the conjugated diolefin.

Other preferred optionally further monomers include unsaturated mono- or di-carboxylic acids or derivatives thereof (e.g., esters, amides and the like) including mixtures thereof.

According to the present invention the substrate is first subject to a metathesis reaction and then hydrogenated.

The metathesis reaction is conducted in the presence of one or more compounds of the general s I, II, III or IV,

Formula I wherein
M is Os or Ru,
R and $R^1$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, X and $X^1$ are independently any anionic ligand,
L and $L^1$ are independently any neutral ligand, such as phosphines, amines, thioethers or imidazolidines or any neutral carbine, optionally, L and $L^1$ can be linked to one another to from a bidentate neutral ligand;

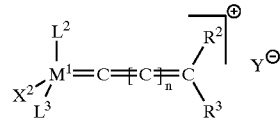

Formula II wherein
$M^1$ is Os or Ru,
$R^2$ and $R^3$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl,
$X^2$ is a anionic ligand,
$L^2$ is a neutral π-bonded ligand, preferably but not limited to arene, substituted arene, heteroarene, independent of whether they are mono- or polycyclic,
$L^3$ is a ligand selected from the group consisting of phosphines, sulfonated phosphines, fluorinated phosphines, functionalized phosphines bearing up to three aminoalkyl-, ammoniumalkyl-, alkoxyalkyl-, alkoxylcarbonylalkyl-, hydrocycarbonylalkyl-, hydroxyalkyl- or ketoalkyl-groups, phosphites, phosphinites, phosphonites, phosphinamines, arsines, stibenes, ethers, amines, amides, imines, sulfoxides, thioethers and pyridines;
$Y^-$ is a non-coordinating anion,
n is an integer in the range of from 0 to 5;

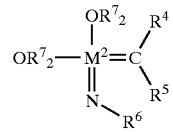

Formula III wherein
$M^2$ is Mo or W,
$R^4$, $R^5$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, C2–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl,
$R^6$ and $R^7$ are independently selected from any unsubstituted or halo-substituted alkyl, aryl, aralkyl groups or silicon-containing analogs thereof;

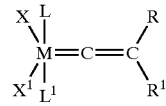

Formula IV wherein
M is Os or Ru,
R and $R^1$ are independently selected from the group consisting of hydrogen, substituted or unsubstituted alkyl, and substituted or unsubstituted alkyl, X and $X^1$ are independently any anionic ligand, and L and $L^1$ are independently any neutral ligand, such as phosphines, amines, thioethers or imidazolidines or any neutral carbine, optionally, L and $L^1$ can be linked to one another to from a bidentate neutral ligand.

Compounds of Formula I are preferred. Compounds of Formula I wherein L and $L^1$ are trialkylphosphines, X and $X^1$ are chloride ions and M is Ruthenium are more preferred.

The amount of compounds will depend upon the nature and catalytic activity of the compound(s) in question. Typically, the ratio of compound(s) to NBR is in the range of from 0.005 to 5, preferably in the range of from 0.025 to 1 and, more preferably, in the range of from 0.1 to 0.5.

The metathesis reaction is carried out in the presence of a co-olefin. The co-olefin may be a hydrocarbon or it may be functionalized, with the caveat that it should not inactivate the metathesis catalyst or otherwise interfere with the reaction. Preferred olefins include, but are not limited to, $C_2$ to $C_{16}$ linear or branched olefins such as ethylene, isobutene, styrene or 1-hexene. Where the co-olefin is a liquid (such as 1-hexene), the amount of co-olefin employed is preferably in the range of from 1 to 200 weight %. Where the co-olefin is a gas (such as ethylene) the amount of co-olefin employed is usually such that it results in a pressure in the reaction vessel in the range of from $2 \times 10^4$ Pa to $2.5 \times 10^7$ Pa, preferably in the range of from $1 \times 10^5$ Pa to $1 \times 10^5$ Pa and, more preferably, in the range of from $5.2 \times 10^5$ Pa to $4 \times 10^6$ Pa.

The metathesis reaction can be carried out in any suitable solvent, which does not inactivate the catalyst or otherwise interfere with the reaction. Preferred solvents include, but are not limited to, dichloromethane, benzene, toluene, tetrahydrofuran, methyl ethyl ketone, cylcohexane and the like. The more preferred solvent is monochlorobenzene (MCB). In certain cases the co-olefin can itself act as a solvent (for example, 1-hexene), in which case no other solvent is necessary.

The concentration of NBR in the reaction mixture is not critical but, should be such that the reaction is not hampered if the mixture is too viscous to be stirred efficiently, for example. Preferably, the concentration of NBR is in the range of from 1 to 40% by weight, more preferably in the range of 6 to 15 wt. %.

The metathesis reaction is preferably carried out at a temperature in the range of from 20 to 140° C.; more preferably in the range of from 60 to 120° C.

The reaction time will depend upon a number of factors, including cement concentration, amount of catalyst used and the temperature at which the reaction is performed. The metathesis is usually complete within the first two hours under typical conditions. The progress of the metathesis reaction may be monitored by standard analytical techniques, for example using GPC or solution viscosity.

Whenever referenced throughout the specification the molecular weight distribution of the polymer was determined by gel permeation chromatography (GPC) using a Waters 2690 Separation Module and a Waters 410 Differential Refractometer running Waters Millennium software version 3.05.01. Samples were dissolved in tetrahydrofuran (THF) stabilized with 0.025% BHT. The columns used for the determination were three sequential mixed-B gel columns from Polymer Labs. Reference Standards used were polystyrene standards from American Polymer Standards Corp.

Reduction of the product from the metathesis reaction can be effected using standard reduction techniques known in the art. For example, homogeneous hydrogenation catalysts known to those of skill in the art, such as Wilkinson's catalyst {$(PPh_3)_3RhCl$} and the like can be used.

Processes for the hydrogenation of NBR are known and may also be used for the production of the hydrogenation products according to the present invention. Rhodium or titanium is generally used as the catalyst, although platinum, iridium, palladium, rhenium, ruthenium, osmium, cobalt or copper in the form of the metals, preferably in the form of metal compounds, may also be used, see for example U.S. Pat. No. 3,700,637; DE-PS 2,539,132; EP-A-134 023; DE-OS 35 41 689; DE-OS 35 40 918; EP-A 298 386; DE-OS 35 29 252; DE-OS 34 33 392; U.S. Pat. No. 4,464,515; and U.S. Pat. No. 4,503,196.

Suitable catalysts and solvents for hydrogenation in homogeneous phase are described in the following, and in GB 1558491 of Bayer AG and in EP 471,250, previously incorporated herein by reference. It is not intended to restrict the catalysts and solvents for hydrogenation useful for the invention, and these are provided only by way of example.

The selective hydrogenation can be achieved by means of a rhodium-containing catalyst. The preferred catalyst is of the formula

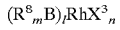

in which each R is a $C_1$–$C_8$-alkyl group, a $C_4$–$C_8$-cycloalkyl group a $C_6$–$C_{15}$-aryl group or a $C_7$–$C_{15}$-aralkyl group, B is phosphorus, arsenic, sulfur, or a sulphoxide group S=0, $X^3$ is hydrogen or an anion, preferably a halide and more preferably a chloride or bromide ion, l is 2, 3 or 4, m is 2 or 3 and n is 1, 2 or 3, preferably 1 or 3. Preferred catalysts are tris(triphenylphosphine)-rhodium(I)-chloride, tris(triphenylphosphine)-rhodium(III)-chloride and tris-(dimethylsulphoxide)-rhodium(III)-chloride, and tetrakis-(triphenylphosphine)-rhodium hydride of formula (($C_6H_5$)$_3$P)$_4$RhH, and the corresponding compounds in which triphenylphosphine moieties are replaced by tricyclohexylphosphine moieties. The catalyst can be used in small quantities. An amount in the range of 0.01 to 1.0% preferably 0.03% to 0.5%, most preferably 0.1% to 0.3% by weight based on the weight of polymer is suitable.

It is known to use the catalyst with a co-catalyst that is a ligand of formula $R^8_mB$, where R, m and B are as defined above, and m is preferably 3. Preferably B is phosphorus, and the R groups can be the same or different. Thus there can be used a triaryl, trialkyl, tricycloalkyl, diaryl monoalkyl, dialkyl monoaryl diaryl monocycloalkyl, dialkyl monocycloalkyl, dicycloalkyl monoaryl or dicycloalkyl monoaryl co-catalysts. Examples of co-catalyst lignands are given in U.S. Pat. No. 4,631,315, the disclosure of which is incorporated by reference. The preferred co-catalyst ligand is triphenylphosphine. The co-catalyst ligand is preferably used in an amount in the range 0.3 to 5%, more preferably 0.5 to 4% by weight, based on the weight of the copolymer. Preferably the weight ratio of the rhodium-containing catalyst compound to co-catalyst is in the range 1:3 to 1:55, more preferably in the range 1:5 to 1:45. The weight of the co-catalyst, based on the weight of one hundred parts of rubber, is in the range 0.1 to 33, preferably 0.5 to 20 and more preferably 1 to 5, and most preferably greater than 2 to less than 5.

The hydrogenation may be performed in situ i.e. in the same reaction vessel in which the metathesis step is carried out, without the need to first isolate the metathesized product. The hydrogenation catalyst is simply added to the vessel, which is then treated with hydrogen to produce the HNBR.

Grubb's catalyst, in the presence of hydrogen, is converted to a dihydride complex $(PR_3)_2RuCl_2H_2$, which is itself an olefin hydrogenation catalyst. Thus, in a one-pot reaction, Grubb's catalyst was used to reduce the molecular weight of NBR in the presence of co-olefin. The reaction mixture was then treated with hydrogen, converting the Grubb's complex to the dihydride species, which then hydrogenated the metathesis product to produce the HNBR of the invention. The rate of hydrogenation was lower in this case than in the case where Wilkinson's catalyst was used for the hydrogenation step, but it is clear that such an approach is indeed a viable one.

Hydrogenation in the present invention is understood by preferably more than 50% of the residual double bonds (RDB) present in the starting nitrile polymer being hydrogenated, preferably more than 90% of the RDB are hydrogenated, more preferably more than 95% of the RDB are hydrogenated and most preferably more than 99% of the RDB are hydrogenated.

The low Mooney HNBR of the present invention can be characterized by standard techniques known in the art. For example, the molecular weight distribution of the polymer was determined by gel permeation chromatography (GPC) using a Waters 2690 Separation Module and a Waters 410 Differential Refractometer running Waters Millennium software version 3.05.01. Samples were dissolved in tetrahydrofuran (THF) stabilized with 0.025% BHT. The columns used for the determination were three sequential mixed-B gel columns from Polymer Labs. Reference Standards used were polystyrene standards from American Polymer Standards Corp.

The Mooney viscosity of the rubber was determined using ASTM test D1646.

EXAMPLES

Examples 1–4

Tris(triphenylphosphine)Rhodium Chloride (Wilkinson's hydrogenation catalyst), Bis(tricyclohexylphosphine) benzylidene ruthenium dichloride (Grubb's metathesis catalyst), 1-hexene, triphenylphosphine (TPP) and monochlorobenzene (MCB) were purchased from JMI, Alfa, Aldrich Chemicals, Elf Atochem and PPG respectively and used as received.

Metathesis:

The metathesis reactions were carried out in a Parr high-pressure reactor under the following conditions:

| | |
|---|---|
| Cement Concentration | 6 or 15 wt. % |
| Co-Olefin | Ethylene or 1-Hexene |
| Co-Olefin Concentration | see Table 1 |
| Agitator Speed | 600 rpm |
| Reactor Temperature | see Table 1 |
| Catalyst Loading (Grubb's) | see Table 1 |
| Solvent | Monochlorobenzene |
| Substrate | statistical Butadiene-acrylonitrilecopolymer with a acrylonitrile content of 34 mol % and a Mooney-Viscosity ML (1 + 4)@ 100 deg. C. of 35 |

The reactor was heated to desired temperature and 60 mL of a monochlorobenzene solution containing Grubb's catalyst was added to the reactor. The reactor was pressurized to the desired ethylene pressure for Examples 1–3 or to 100 psi of Nitrogen for Example 4. The temperature was maintained constant for the duration of the reaction. A cooling coil connected to a temperature controller and a thermal sensor was used to regulate the temperature. The progress of the reaction was monitored using solution viscosity measurements for the 6% cements. At higher cement concentration, the reaction was assumed to be complete after 18 hours.

Hydrogenation:

The hydrogenation reactions were carried out in the same reactor as the metathesis under the following conditions:

| | |
|---|---|
| Cement solid concentration | 12% |
| $H_2$ (g) pressure | 1200 psi |
| Agitator Speed | 600 rpm |
| Reactor Temperature | 138° C. |
| Catalyst Loading (Wilkinson's) | 0.08 phr |
| Triphenylphosphine | 1 phr |
| Solvent | Monochlorobenzene |

The cement from the metathesis reaction was degassed 3 times with $H_2$ (100 psi) under full agitation. The temperature of the reactor was raised to 130° C. and a 60 mL monochlorobenzene solution containing Wilkinson's catalyst and triphenylphosphine was added to the reactor. The temperature was allowed to increase to 138° C. and maintained constant for the duration of the reaction. The hydrogenation reaction was monitored by measuring the residual double bond (RDB) level at various intervals using IR spectroscopy.

Alternatively, the Ruthenium metathesis catalyst could be used to hydrogenate the polymer. In such an in situ process the metathesis catalyst, upon treatment with hydrogen, is converted to a compound which can act as a hydrogenation catalyst.

Example 1

Details 200 g of rubber was dissolved in 1133 g of MCB (15 wt.-% solid). The cement was then charged to the reactor and degassed 3 times with $C_2H_4$ ($6.9 \times 10^5$ Pa) under full agitation.

Example 2

Details 200 g of rubber was dissolved in 1133 g of MCB (15 wt.-% solid). The cement was then charged to the reactor and degassed 3 times with $C_2H_4$ ($6.9 \times 10^5$ Pa) under full agitation.

Example 3

Details 75 g of rubber was dissolved in 1175 g of MCB (6 wt.-% solid). The cement was then charged to the reactor and degassed 3 times with $C_2H_4$ ($6.9 \times 10^5$ Pa) under full agitation.

Example 4

Details 75 g of rubber was dissolved in 1175 g of MCB (6 wt.-% solid). The cement was then charged to the reactor. 150 g of 1-hexene was added to the reactor and the mixture was degassed 3 times with dry $N_2$ under full agitation.

TABLE 1

Experimental Details

|  | Example 1 | Example 2 | Example 3 | Example 4 |
|---|---|---|---|---|
| Cement Concentration | 15% | 15% | 6% | 6% |
| Co-olefin | $C_2H_4$ | $C_2H_4$ | $C_2H_4$ | 1-hexene |
| Co-olefin Concentration | 500 psi | 500 psi | 500 psi | 150 g |
| Reactor Temperature | 80° C. | 80° C. | 80° C. | 80° C. |
| Catalyst Load | 0.05 phr | 0.10 phr | 0.25 phr | 0.25 phr |

For a typical product the Mn is 27 kg/mol (compared to 85 kg/mol for the starting polymer) whilst the Mw is 54 kg/mol (compared to 296 kg/mol for the starting polymer). As expected, the molecular weight distribution falls from 3.4 for the starting substrate to 2.0 for the metathesized product.) This is consistent with a more homogeneous range of polymer chain lengths and molecular weights.

A summary of the polymer properties for selected samples is shown in Table 2. The GPC results show up to a fivefold reduction in Mw and a narrowing of the polydispersity index to a minimum of 1.90.

TABLE 2

Summary of Polymer Properties

|  | MN | MW | MZ | PDI | Mooney Viscosity (ML 1 + 4 @ 100 deg. C.) |
|---|---|---|---|---|---|
| Therban ® A3407 comp. | 98000 | 320000 | 945000 | 3.27 | 73 |
| Substrate | 85000 | 296000 | 939000 | 3.50 |  |
| Experiment 1 | 73000 | 189000 | 441000 | 2.59 | 43 |
| Experiment 2 | 60000 | 136000 | 277000 | 2.27 | 28 |
| Experiment 3 | 31000 | 59000 | 98000 | 1.90 | 3 |
| Experiment 4 | 55000 | 111000 | 1197000 | 2.02 | 31 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a hydrogenated nitrile rubber comprising the steps of
    a) reacting a nitrile rubber in the presence of at least one co-olefin and at least one compound selected from the group consisting of compounds of the general formulas I, II, III or IV,

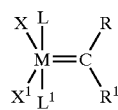

Formula I wherein
M is Os or Ru,
R and $R^1$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, X and $X^1$ are independently any anionic ligand, L and $L^1$ are, independently, any neutral ligand, optionally, L and $L^1$ can be linked to one another to from a bidentate neutral ligand;

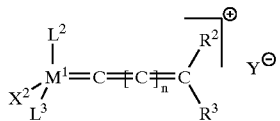

Formula II wherein
$M^1$ is Os or Ru;
$R^2$ and $R^3$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, $X^2$ is a anionic ligand, and $L^2$ is a neutral mono- or polycyclic □-bonded ligand, $L^3$ is a ligand selected from the group consisting of phosphines, sulfonated phosphines, fluorinated phosphines, functionalized phosphines bearing up to three aminoalkyl-, ammoniumalkyl-, alkoxyalkyl-, alkoxylcarbonylalkyl-, hydrocycarbonylalkyl-, hydroxyalkyl- or ketoalkyl- groups, phosphites, phosphinites, phosphonites, phosphinamines, arsines, stibenes, ethers, amines, amides, imines, sulfoxides, thioethers and pyridines, $Y^-$ is a non-coordinating anion, n is an integer in the range of from 0 to 5,

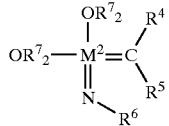

Formula III wherein
$M^2$ is Mo or W, $R^4$, $R^5$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl;

$R^6$ and $R^7$ are independently any unsubstituted or halo-substituted alkyl, aryl, aralkyl groups or silicon-containing analogs thereof,

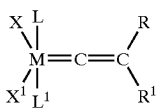

Formula IV wherein
M is Os or Ru,
R and $R^1$ are independently selected from the group consisting of hydrogen, substituted or unsubstituted alkyl, and substituted or unsubstituted alkyl
X and $X^1$ are independently any anionic ligand, and
L an $L^1$ are independently any neutral ligand; and
b) hydrogenating the product of step a).

2. A process according to claim 1 wherein the hydrogenation is performed under homogeneous catalytic conditions.

3. A process according to claim 2 wherein the homogeneous catalytic reduction is carried out in situ.

4. A process according to claim 1 wherein no additional hydrogenation catalyst is added before or during step b).

5. A process according to claim 1 wherein the metathesis catalyst is a compound of Formula I.

6. A process according to claim 5 wherein L and $L^1$ are trialkylphosphines, X and $X^1$ are chloride ions and M is ruthenium.

7. A process according to claim 1 wherein the ratio of compound to nitrile rubber is in the range of from 0.005 to 5.

8. A process according to claim 1 wherein the co-olefin is a $C_2$ to $C_{16}$ linear or branched olefin.

9. A process according to claim 1 wherein the co-olefin is a liquid and the amount of co-olefin employed is in the range of from 1 to 50 weight %.

10. A process according to claim 1 wherein the co-olefin is a gas and the amount of co-olefin employed is such that the resulting pressure in the reaction vessel is in the range of from $2 \times 10^4$ Pa to $2.5 \times 10^7$ Pa.

11. A process according to claim 1 wherein the process is carried out in an inert solvent selected from the group consisting of monochlorobenzene, dichloromethane, benzene, toluene, tetrahydrofuran and cyclohexane.

12. A process according to of claim 1 wherein the hydrogenation is carried out using a catalyst of formula:

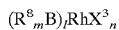

wherein $R^8$ is independently selected from the group consisting of a $C_1$–$C_8$-alkyl group, a $C_4$–$C_8$-cycloalkyl group, a $C_6$–$C_{15}$-aryl group and a $C_7$–$C_{15}$-aralkyl group;
B is selected from the group consisting of phosphorus, arsenic, sulfur, and a sulphoxide group (S=O);
$X^3$ is selected from the group consisting of hydrogen and an anion; and
l is 2, 3 or 4, m is 2 or 3 and n is 1,2 or 3.

13. A process according to claim 12 wherein the hydrogenation catalyst is $(PPh_3)_3RhCl$.

* * * * *